Dec. 2, 1947.                    B. CYR                    2,431,735
                LOCKING DEVICE FOR SCREWS AND NUTS
                        Filed Oct. 22, 1942
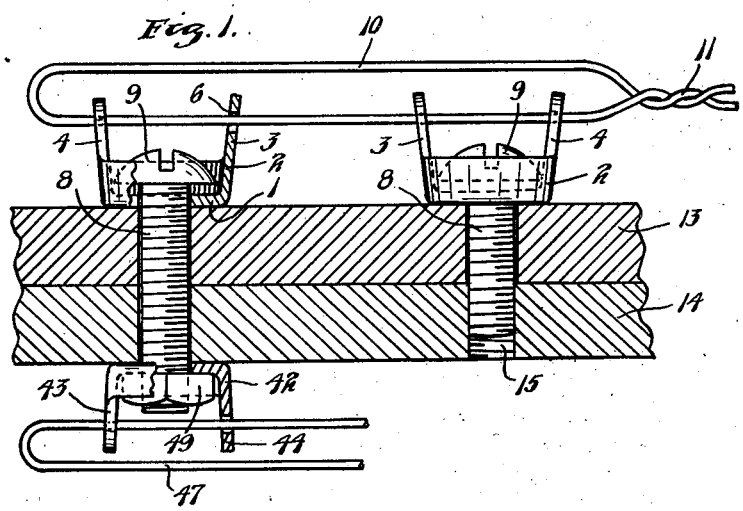
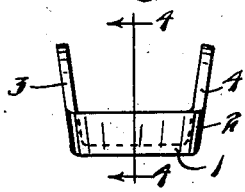   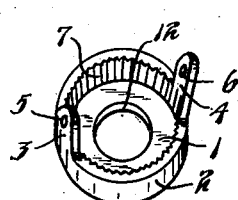   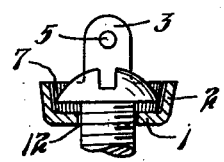
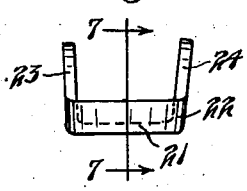   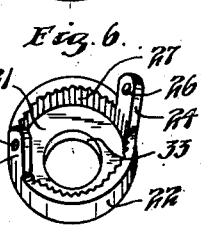   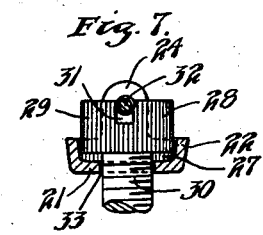
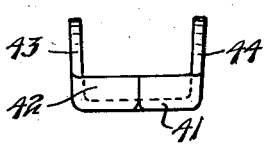   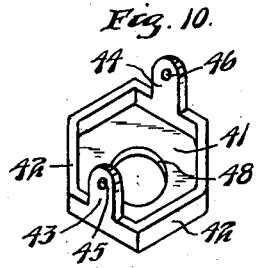   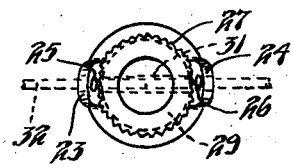
Inventor
BENJAMIN CYR.
By
George H. Fisher
Attorney Patented Dec. 2, 1947

2,431,735

UNITED STATES PATENT OFFICE 2,431,735

LOCKING DEVICE FOR SCREWS AND NUTS

Benjamin Cyr, Minneapolis, Minn., assignor to Minneapolis-Honeywell Regulator Company, Minneapolis, Minn., a corporation of Delaware Application October 22, 1942, Serial No. 462,928

2 Claims. (Cl. 151—32)

My invention relates to locking devices for holding and retaining a member such as a screw and nut against becoming unscrewed or loosened due to vibration or other causes.

Heretofore, it has been the conventional practice to secure such a member by drilling a hole through the head of the member and inserting a wire therethrough, the wire being fastened in any convenient manner. Such drilling operation however, is costly and impedes rapid production.

It is therefore an object of my invention to provide a simple, inexpensive, and efficient retainer whereby such nuts or screws may be readily locked in tight position.

Another object of my invention is to provide a cup-shaped washer formed preferably of case hardened metal and having outwardly tapered or flared walls on which are provided suitable teeth for serrating the softer metal of the head of a conventional round headed screw or nut as the same is forced into the cup-shaped washer so as to secure said head in the cup-shaped washer against rotative movement apart from the washer.

Another object of my invention is to provide a simple and convenient means whereby the washer may be locked against rotative movement and the head of the screw or nut locked within the cup-shaped washer against rotative movement.

Another object of my invention is to provide a cup-shaped washer and means for locking the head of a screw which may include a wire fastened to the washer and disposed within the kerf or slot portion of the screw head so as to lock the screw within the washer and against rotative movement of the screw separate and apart from the washer.

Another object of my invention is to provide a knurled screw head or nut, a cup-shaped washer having serrations formed circumferentially around the inner wall surface of the washer for cooperating with the knurled portion of the said head so as to prevent the rotative movement of the head separate from the washer.

Another object of my invention is to provide a cup-shaped washer for receiving the head of a screw or nut and means for preventing the rotative movement of said head within the cup together with upwardly projecting ears mounted on the cup and suitably apertured for receiving a fastening member for preventing the rotative movement of the washer.

Another object of my invention is to provide a cup-shaped washer having a plurality of sides for cooperating with a similar sided head of a nut or screw for fastening the same to the washer together with simple and convenient means for locking the bolt within the cup-shaped washer and fastening the washer against rotative movement.

Another object of my invention is to provide a washer for locking the conventional screw or nut which may be conveniently stamped out of sheet metal rapidly and at low cost.

Other objects and advantages of this invention are set forth in the following description, taken with the accompanying drawings, and the novel features thereof are pointed out in the appended claims. The disclosure, however, is illustrative only and I may make changes in details, especially in matters of shape, size and arrangements of parts within the principle of my invention, to the full extent indicated by the meanings of the terms in which the appended claims are expressed.

In the accompanying drawings wherein like reference characters indicate corresponding parts of the various figures, Figure 1 is a side elevation of my invention applied as a screw head lock and nut holder;

Figure 2 is an elevational view of one form of my invention;

Figure 3 is a perspective view of the device shown in Figure 2;

Figure 4 is a sectional view of the device shown in Figure 2 taken along the line 4—4 and showing a screw head in engaging relation within the cup-shaped washer;

Figure 5 is a side elevational view of a second form of my invention;

Figure 6 is a perspective view of the device shown in Figure 5;

Figure 7 is a sectional view of the device shown in Figure 5 taken along the line 7—7 looking in the direction of the arrows, and showing a screw head in engaging relation therein and with the fastening member within the kerf portion of the screw head;

Figure 8 is a top plan view of the device shown in Figure 5 with the bolt and fastening member shown in dotted lines;

Figure 9 is a side elevational view of a third form of my invention, and

Figure 10 is a perspective view of the device shown in Figure 9.

In the form of my invention illustrated in Figures 1, 2, 3, and 4, there is provided a cup-shaped washer 1 having an outwardly flared side wall 2. Projecting from the side wall 2 are ears 3 and 4 which are suitably apertured at 5 and 6. The washer 1 is further centrally apertured at 12 for receiving the stem of a conventional screw 8. Along the tapered inner surface of the side walls 2 are formed suitable serrations 7, as best shown in Figure 4. The said cup-shaped washer 1 is preferably formed of case hardened steel. Thus, as shown in Figure 4 upon the conventional screw 8 having a head portion 9 formed of softer metal being inserted in the tapered cup portion of the washer 1, the serrations 7 will serrate the edge of the head 9 as the same is forced inwardly so as to secure the same within the cup portion of the washer against rotative movement. Upon the screw 8 being tightened as desired through rotation of the washer together with the screw, a fastening wire 10 may be inserted through the apertures in the ears 3 and 4 and thereby fasten the screw 8 and in turn the washer 1 against rotative movement. The fastening wire 10 may be disposed in apertures formed in a similarly provided bolt and washer arrangement and twisted in fastened relation at 11, as best shown in Figure 1. If a series of bolts are not used, the wire may be fastened to any other suitable fastening means.

It will be readily seen that the foregoing washer arrangement would be adaptable for use with the conventional screw or nut and does not require especially formed screws or nuts or the expensive and slow process of drilling the heads of each screw or nut. As shown in Figure 1 the locking washer arrangement may be applied to a screw and nut combination or may be applied merely to a screw or bolt head 9 having the bolt or stem portion 8 screw threadedly engaged within the work or elements to be fastened 13 and 14 in a suitable fixed screw threaded portion such as indicated by numeral 15. The lock washer arrangement herein provided presents a substantially flat surface to the element to be fastened 13 so as not to interfere with the rotation of such washer while the screw 9 is being fastened by the rotation thereof. After the screw or bolt 9 has been tightened a fastening wire 10 may be inserted through the apertures in the ears 3 and 4 and thereby fastening the screw 8 and in turn the washer 1 against rotative movement as previously explained.

While in Figure 1 the wire 10 is shown as extending through the apertured ears of a series of washers in substantial alignment, obviously the same effect may be accomplished by stringing the fastening wire 10 back and forth between respective fastening washers on bolts or nuts which may be positioned out of alignment or other suitable means may be employed to fasten the wire 10 so as to hold the washer 1 from rotative movement. Further, it will be seen by the novel fastening means employed the wire 10 will not only lock the washer from turning but will also lock the head of the screw within the washer and thereby provide a very simple and efficient means for locking a screw or nut from turning.

A second form of my invention is shown in Figures 5, 6, 7 and 8, wherein I have provided another outwardly flared cup-shaped washer 21 having an annular side wall 22. Ears 23 and 24 project from the side wall 22 and have formed therein suitable apertures 25 and 26. The washer 21 is centrally apertured at 33 for receiving the stem of a bolt 30. Along the inner circumference of the side wall 22 are preferably formed serrations 27 for cooperation with similar serrations 28 formed about the circumference of a head 29 of bolt 30, as shown in Figure 7, disposed within the cup portion of the washer 21. As shown in Figures 7 and 8, the head 29 of the bolt 30 may be positioned within the washer 21 so that the kerf or slot portion 31 of the bolt head 29 is in alignment with the apertures 25 and 26 so that a wire or fastening means 32 inserted through the apertures 25 and 26 will also pass through the slot 31 and thus serve as a further means for holding the head of the bolt from rotation and fastening the same within the cup portion of the washer 21. The wire 32 may be fastened so as to prevent rotation of the washer and in turn the bolt 30 as shown in Figure 1 or in any other suitable manner. Washer 21 differs from washer 1 in that it may be made of a softer metal such as brass instead of case hardened steel and the serrations 27 are machined to exactly cooperate with the serrations 28 of the bolt member.

A third form of my invention is illustrated in Figures 9 and 10, wherein there is provided another outwardly flared cup-shaped washer 41 having a plurality of sides 42. While the sides of the washer are shown in an outwardly flared hexagonal form, it will be readily apparent that the same may be of any desired number of sides. Projecting from the side walls are ears 43 and 44 suitably apertured at 45 and 46. The washer 41 is further suitably apertured at 48 for receiving the stem of a conventional bolt. The latter form of my invention is particularly adapted for use with the conventional hexagonal bolt head or nut such as shown at 49 which is positioned within the hexagonally shaped cup as shown in the lower portion of Figure 1, and the washer is secured from rotation by the wire 47 disposed through the apertures 45 and 46 and fastened to any convenient fastening means. Obviously the foregoing lock washer arrangement may be applied to a many sided bolt head or nut for application in the case of said bolt to a fixed screw threaded portion within the work or in the case of such nut to a fixed bolt mounted on the work.

It is to be understood that the forms of the invention herein shown and described are to be taken merely as preferred examples of the same and that such changes in the arrangement and construction of the parts may be made as will remain within the spirit of the invention and the scope of the appended claims.

I claim as my invention:

1. A device for preventing rotation of a round-headed screw comprising a surface hardened sheet metal stamping having a flat washer-like base portion and an annular raised edge portion having a grooved conical inner surface which incises and interlocks with a round screw head when it is drawn toward the base portion, and at least one perforation in the raised edge portion for engaging a locking wire.

2. A device for preventing rotation of screw threaded fastening means comprising a surface hardened sheet metal stamping having a flat washer-like base portion and an annular raised edge portion having a grooved conical inner surface which incises and interlocks with the periphery of said fastening means when it is drawn toward the base portion, the grooves on said inner surface extending substantially to said base portion.

BENJAMIN CYR.

REFERENCES CITED

The following references are of record in the file of this patent:

UNITED STATES PATENTS

| Number | Name | Date |
|---|---|---|
| 1,093,474 | Rolka | Apr. 14, 1914 |
| 1,379,607 | Ashley | May 31, 1921 |
| 1,379,606 | Ashley | May 31, 1921 |
| 465,848 | Gray | Dec. 29, 1891 |
| 620,812 | Ward | Mar. 7, 1899 |
| 1,199,684 | Forbes | Sept. 26, 1916 |
| 2,204,385 | Schmidt et al. | June 11, 1940 |
| 574,553 | MacDougall | Jan. 5, 1897 |
| 1,386,536 | Silver | Aug. 2, 1921 |
| 1,432,243 | Harris | Oct. 17, 1922 |
| 2,371,927 | Schmidt et al. | Mar. 20, 1945 |